US012165461B2

(12) United States Patent
Kudo et al.

(10) Patent No.: US 12,165,461 B2
(45) Date of Patent: Dec. 10, 2024

(54) PUSH BUTTON DEVICE

(71) Applicant: OMRON CORPORATION, Kyoto (JP)

(72) Inventors: Takuya Kudo, Kyoto (JP); Masaaki Sumi, Kyoto (JP); Hiroyuki Onitsuka, Kyoto (JP); Takehiro Agata, Kyoto (JP)

(73) Assignee: OMRON Corporation, Kyoto (JP)

( * ) Notice: Subject to any disclaimer, the term of this patent is extended or adjusted under 35 U.S.C. 154(b) by 206 days.

(21) Appl. No.: 17/629,431

(22) PCT Filed: Mar. 9, 2020

(86) PCT No.: PCT/JP2020/010082
§ 371 (c)(1),
(2) Date: Jan. 24, 2022

(87) PCT Pub. No.: WO2021/038931
PCT Pub. Date: Mar. 4, 2021

(65) Prior Publication Data

US 2022/0245990 A1 Aug. 4, 2022

(30) Foreign Application Priority Data

Aug. 29, 2019 (JP) ................................ 2019-157371

(51) Int. Cl.
*G07F 17/32* (2006.01)

(52) U.S. Cl.
CPC ...... *G07F 17/3209* (2013.01); *G07F 17/3216* (2013.01)

(58) Field of Classification Search
CPC .... H01H 9/20; H01H 13/04; H01H 2207/014; H01H 3/12; H01H 2223/034; G07F 17/3209; A63F 2009/2401
See application file for complete search history.

(56) References Cited

U.S. PATENT DOCUMENTS 9,147,532 B2 * 9/2015 Meftah .................. H01H 3/022
9,355,794 B2 5/2016 Chu
(Continued)

FOREIGN PATENT DOCUMENTS

JP 2004-171912 A 6/2004
JP 4108453 B2 6/2008
(Continued)

OTHER PUBLICATIONS

English translation of the International Search Report of a international application PCT/JP2020/010082, issued on Jun. 2, 2020.
(Continued)

*Primary Examiner* — Jay Trent Liddle
*Assistant Examiner* — Jason Pinheiro
(74) *Attorney, Agent, or Firm* — METROLEX IP LAW GROUP, PLLC; Robert L. Scott, Esq

(57) ABSTRACT

There is provided a push button device with which a support plate can be disposed close to a display screen without providing the support plate with a latching mechanism, and which can be easily attached and detached. The invention comprises a push button device that is inserted into the opening of a transparent plate from the front side, and an annular lock plate that is disposed on the back side of the transparent plate and is fitted to the outer peripheral portion of the bottom part of the push button device from the back side. A snap-fit structure that is fixed to the outer peripheral portion of the bottom part by rotating the lock plate is provided to the outer peripheral portion of the bottom part of the push button device and to the inner peripheral portion of the lock plate. The lock plate is configured to have a larger diameter than the opening in the transparent plate, and such that the surface on the support plate side hits the support plate in a state of being fixed to the outer peripheral portion of the bottom part.

6 Claims, 15 Drawing Sheets

(56) References Cited

U.S. PATENT DOCUMENTS

| | | | | |
|---|---|---|---|---|
| 9,613,768 | B2 | 4/2017 | Tallone et al. | |
| 9,653,235 | B2 * | 5/2017 | Shimoyama | H01H 3/022 |
| 9,984,837 | B2 * | 5/2018 | Ockert | G08B 5/36 |
| 2009/0107817 | A1 | 4/2009 | Onuki et al. | |
| 2010/0243418 | A1 * | 9/2010 | Machida | H01H 3/022 200/341 |
| 2012/0111706 | A1 * | 5/2012 | Seckel | H01H 13/86 200/345 |
| 2012/0217141 | A1 * | 8/2012 | Yamasaki | H01H 13/52 200/43.13 |
| 2013/0143665 | A1 * | 6/2013 | Taniguchi | G07F 17/3209 463/37 |
| 2013/0199907 | A1 * | 8/2013 | Sugihara | H01H 13/10 200/296 |
| 2014/0057727 | A1 * | 2/2014 | Oehlert | H01H 13/063 463/46 |
| 2014/0187321 | A1 * | 7/2014 | Morimoto | A63F 13/00 463/31 |
| 2014/0364235 | A1 * | 12/2014 | Sugiyama | H03K 17/97 463/37 |
| 2015/0094130 | A1 * | 4/2015 | Onitsuka | G07F 17/3209 463/20 |
| 2015/0094131 | A1 * | 4/2015 | Onitsuka | G07F 17/3213 463/20 |
| 2015/0094149 | A1 * | 4/2015 | Sumi | H01H 13/83 463/37 |
| 2015/0122627 | A1 * | 5/2015 | Pora | H01H 19/04 439/692 |
| 2015/0303658 | A1 * | 10/2015 | Wu | H01H 9/08 74/529 |
| 2015/0364271 | A1 * | 12/2015 | Huang | H01H 13/14 74/491 |
| 2015/0367232 | A1 * | 12/2015 | Onitsuka | A63F 13/24 463/38 |
| 2016/0335843 | A1 * | 11/2016 | Agata | H01H 13/83 |
| 2016/0335845 | A1 * | 11/2016 | Onoyama | G02B 6/0051 |
| 2017/0243706 | A1 * | 8/2017 | Yoshida | H01H 13/10 |
| 2018/0056177 | A1 * | 3/2018 | Sakamoto | G05G 1/02 |
| 2018/0130617 | A1 * | 5/2018 | Wu | H01H 9/285 |
| 2019/0041245 | A1 * | 2/2019 | Griggs | G01D 11/245 |
| 2019/0147690 | A1 | 5/2019 | Sumi et al. | |
| 2022/0245990 | A1 | 8/2022 | Kudo et al. | |
| 2022/0270834 | A1 * | 8/2022 | Kudo | H01H 13/04 |

FOREIGN PATENT DOCUMENTS

| | | | |
|---|---|---|---|
| JP | 4850808 | B2 | 1/2012 |
| JP | 5678787 | B2 | 3/2015 |
| JP | 2017-012636 | A | 1/2017 |
| JP | 2019-088387 | A | 6/2019 |
| WO | 2021/038929 | A1 | 3/2021 |

OTHER PUBLICATIONS

English translation of the Written Opinion of a international application PCT/JP2020/010082, issued on Jun. 2, 2020.

English translation of the International Search Report of a related international application PCT/JP2020/009926, issued on Jun. 2, 2020.

English translation of the Written Opinion of a related international application PCT/JP2020/009926, issued on Jun. 2, 2020.

Office Action issued on May 9, 2023 in a counterpart Japanese patent application.

Office Action issued on Apr. 26, 2023 in a related US patent application.

* cited by examiner (PLAN VIEW)

(SIDE VIEW)

PUSH BUTTON DEVICE

TECHNICAL FIELD

The present invention relates to a push button device, and more particularly to a thin push button device that is attached to a support plate disposed on a display screen.

BACKGROUND ART

In a casino or other such game facility, a plurality of slot machines or other such game machines manufactured by a variety of game machine makers are installed, and a player selects a preferred game machine and plays a game. Therefore, the game machine needs to have an appeal that will make players want to play the game.

In a game machine, the operation unit is provided at a position that is prominent in appearance on the front surface facing the player, and is the portion that is directly operated by the player. Accordingly, the operation unit is an important component for making the game machine more appealing to the player, and the push button device disposed on the operation unit is also an important component for making the game machine more appealing.

The applicant of the present application also invented a thin, transparent push button device that is installed on the screen of a display device installed in an operation unit, and has applied for a patent prior to the present application (Patent Literature 1). In this invention, the central portion of the push button unit that is pressed is formed from a transparent material so that the display screen below can be seen through the push button unit. This push button device is fixed to a transparent support plate disposed on the display screen, by screws, a sliding latching mechanism provided on the support plate side, or the like.

Also, Patent Literature 2 describes a configuration in which a push button device is attached to a support plate via a lock case disposed on the back side of the support plate by rotating a rotary lock member provided to the push button device.

CITATION LIST

Patent Literature

Patent Literature 1: Japanese Published Patent Gazette "JP-A 2019-088387"

Patent Literature 2: Japanese Published Patent Gazette "JP-A 2017-12636"

SUMMARY

However, the following problems are encountered in conventional fixing using screws or a latching mechanism. That is, when fixing with screws, the thickness of the push button device is increased in order to provide an engagement allowance for the screws. If the thickness of the push button device increases, the portion protruding from the back side of the support plate becomes longer, so the distance between the support plate and the display screen increases. Also, since the screws used are small, attaching and detaching the push button device cannot be considered easy.

On the other hand, when fixing using a latching mechanism, the thickness of the push button device does not increase as it does in fixing with screws, so the distance between the support plate and the display screen can be shorter. Also, since a latching mechanism is used, the push button device can be easily attached and detached. However, a drawback is the need to provide a latching mechanism to the support plate.

Also, the configuration described in Patent Literature 2 affords easy attachment and detachment of the push button device without having to provide a latching mechanism on the support plate. However, this configuration is suited to a thick push button device, and it is not applicable to the attachment of a push button device that is thin and in which the interior the push button unit is transparent.

It is an object of one mode of the present invention to realize a push button device in which a support plate can be disposed close to a display screen without having to provide a latching mechanism on the support plate, and which can be easily attached and detached.

In order to solve the above problem, the push button device according to one mode disclosed herein comprises a push button device main body having a flange portion that latches to an opening formed in a support plate, and being inserted into the opening from the front side; and an annular lock plate that is disposed on the back side of the support plate, is fitted to the outer peripheral portion of the bottom part of the push button device main body on the back side of the support plate, and is fixed to the outer peripheral portion of the bottom part by being rotated, wherein a snap-fit structure, which is fixed to the outer peripheral portion of the bottom part by rotating the lock plate, is provided to the inner peripheral portion of the lock plate and the outer peripheral portion of the bottom part, and the lock plate is configured to have a larger diameter than the opening, and such that the surface on the support plate side hits the support plate in a state of being fixed to the outer peripheral portion of the bottom part.

EFFECT

With one mode of the present invention, it is possible to realize a push button device in which a support plate can be disposed close to a display screen without having to provide the support plate with a latching mechanism, and which can be easily attached and detached.

DESCRIPTION OF EMBODIMENTS

Embodiment 1

An embodiment according to one aspect disclosed herein (hereinafter, also referred to as "this embodiment") will be described with reference to the drawings. In this embodiment, as one mode of the push button device disclosed herein, a configuration will be described in which the push button device is installed in a game machine such as a slot machine.

§ 1 Application Example

Figure 1:
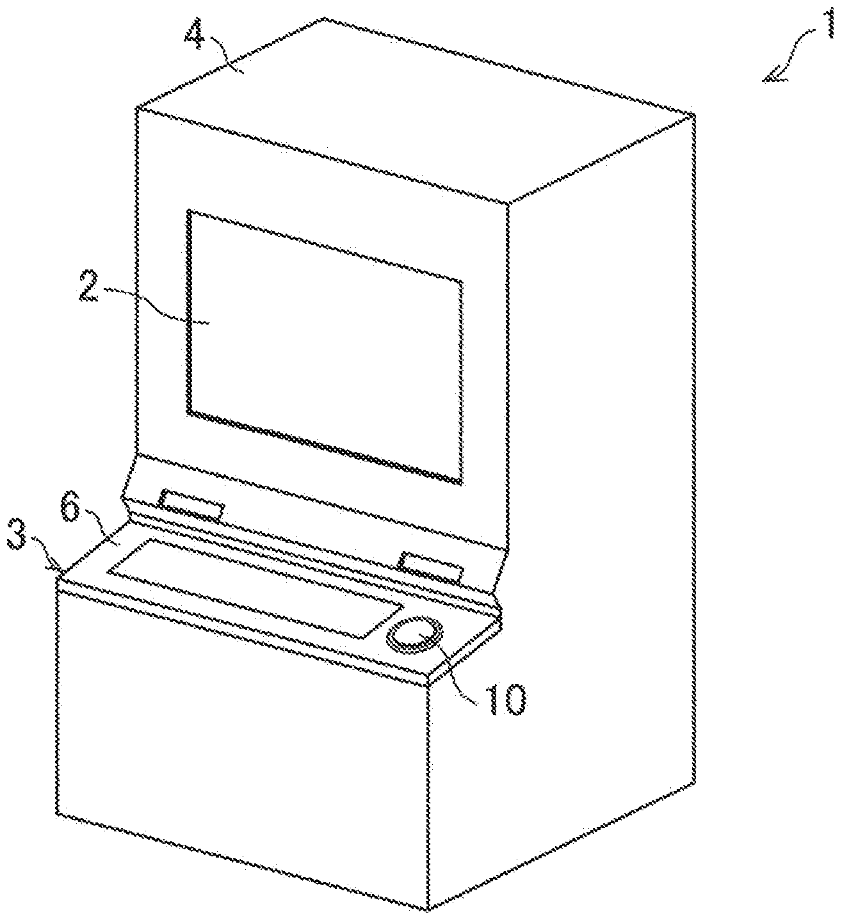
FIG. 1 is an oblique view of a slot machine equipped with a push button device according to an embodiment of the present invention.

First, an example of a situation in which the push button device 10 is applied will be described with reference to FIGS. 1, 2, 4, 5, 5, 9, and 10. FIG. 1 is an oblique view of a slot machine 1 in which a push button device 10 is installed. The "push button device main body" of the present invention is in a state in which the lock plate 40 (discussed below) has been removed from the push button device 10. For the sake of description, a state in which the lock plate 40 is not included is also referred to as the push button device 10.

As shown in FIG. 1, in a slot machine 1 (game machine), a display monitor 2 is provided at a position corresponding to the player's line of sight at the upper part of a housing 4, and an operation unit 3 is provided on the lower front side (player side) of the housing 4 below the display monitor 2.

The operation unit 3 is provided on the upper surface of a protruding portion that juts out forward from the lower part of the housing 4, and an LCD or other such display device (not shown) is disposed thereon. A push button device 10 is installed so as to overlap the display screen of the display device, and the display screen can be seen through the push button unit 12 (see FIG. 2).

Figure 2:
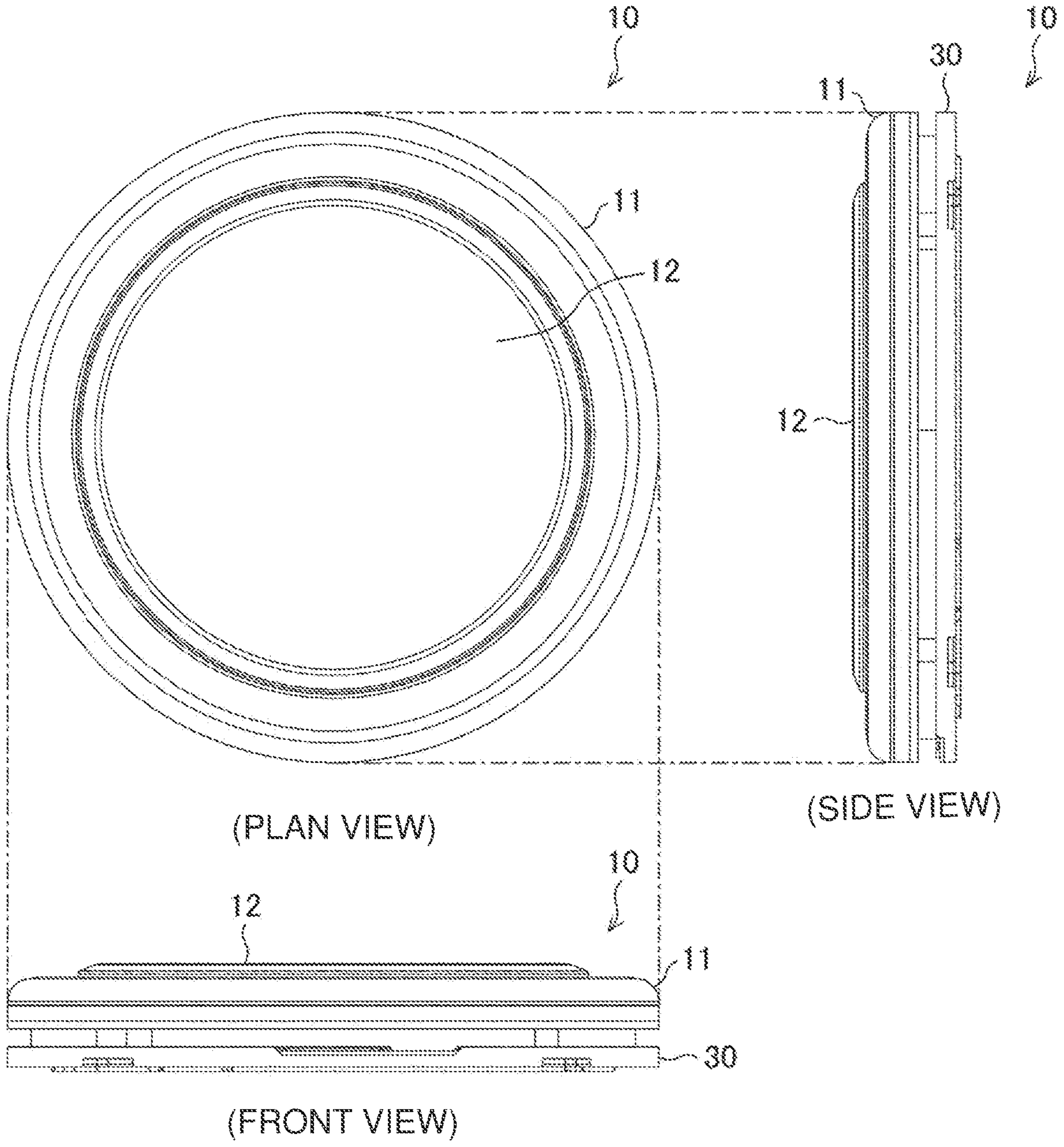
FIG. 2 is a plan view, a front view, and a side view of the push button device.

As shown in FIG. 2, the push button device 10 has a base 30, a bezel 11, and a push button unit 12 that is pressably supported between the base and the bezel. The push button unit 12 is formed from a transparent material, except for the outer peripheral portion.

Figure 4:
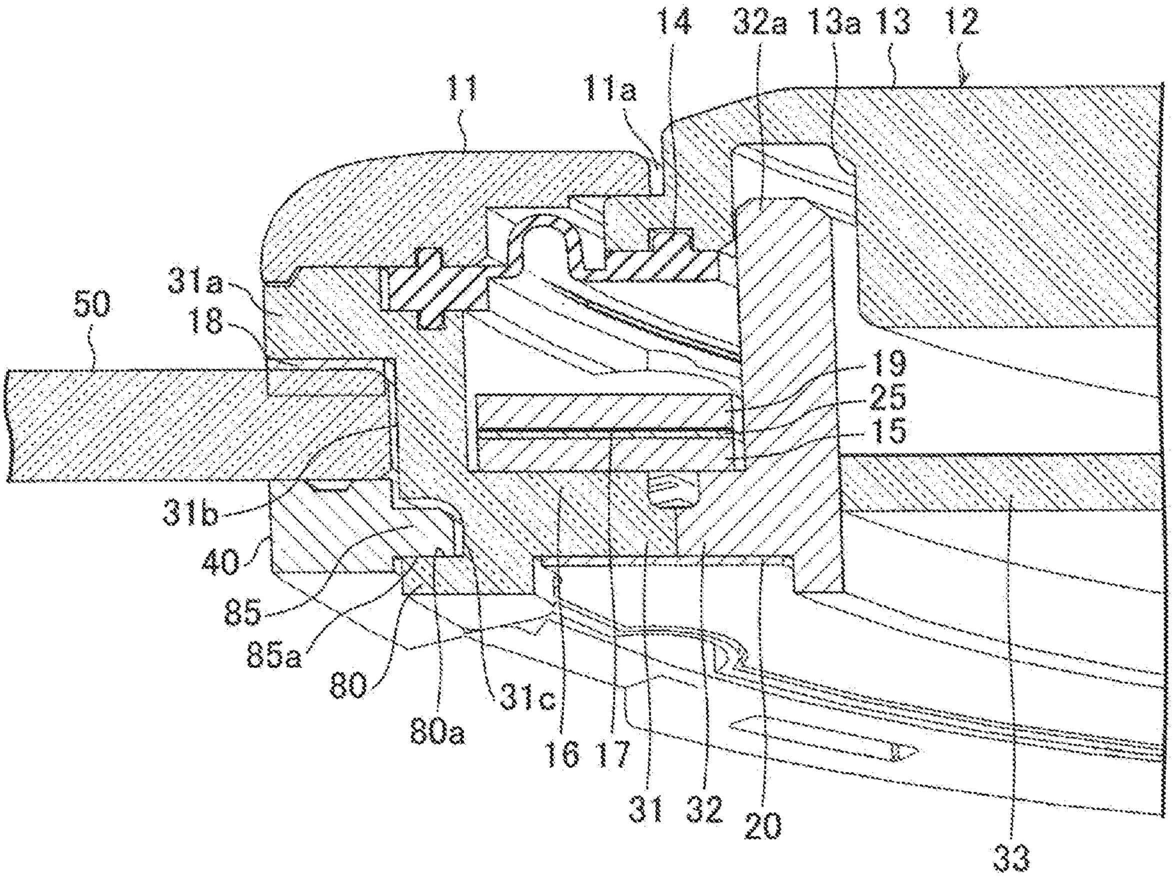
FIG. 4 is a partial cross-sectional oblique view of the main components of the push button device attached to a transparent plate.
Figure 5:
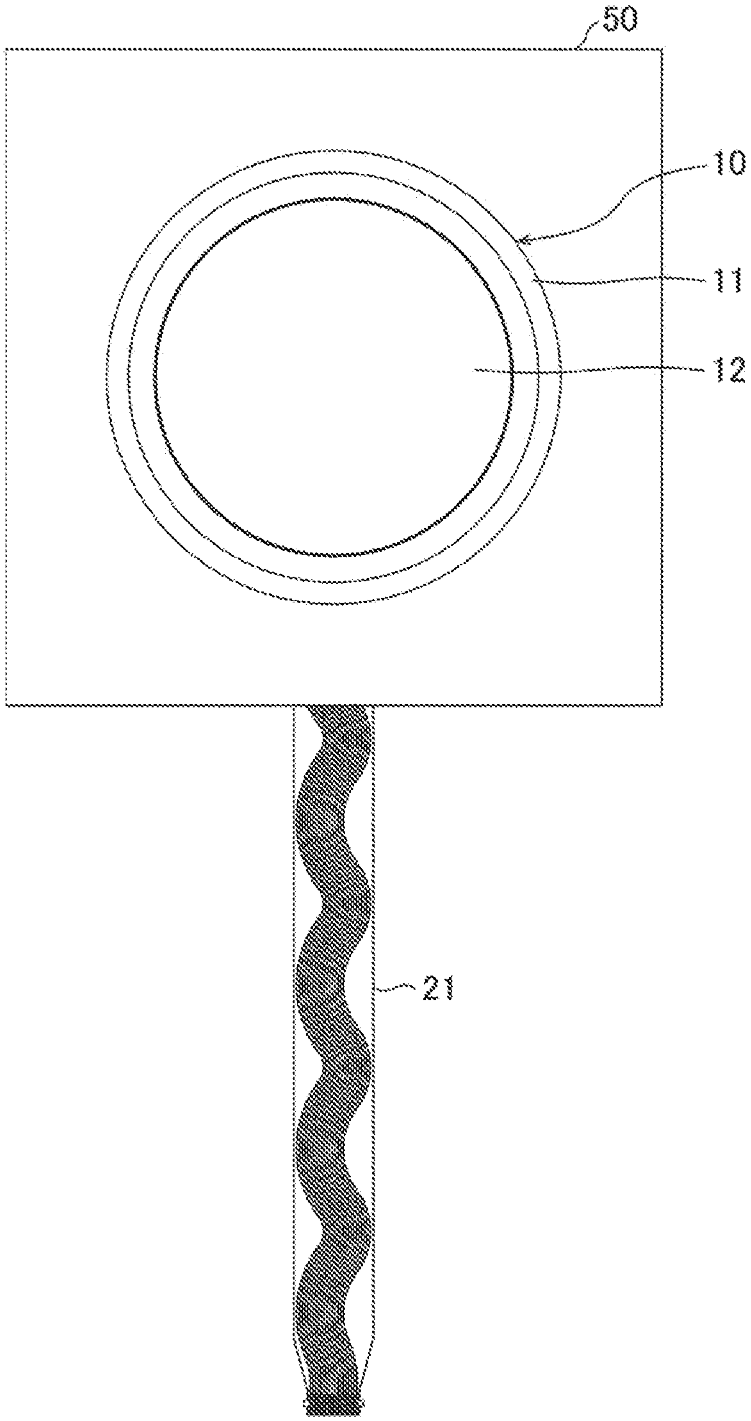
FIG. 5 is a plan view and a side view showing a state in which the push button device is attached to the transparent plate.
Figure 5:
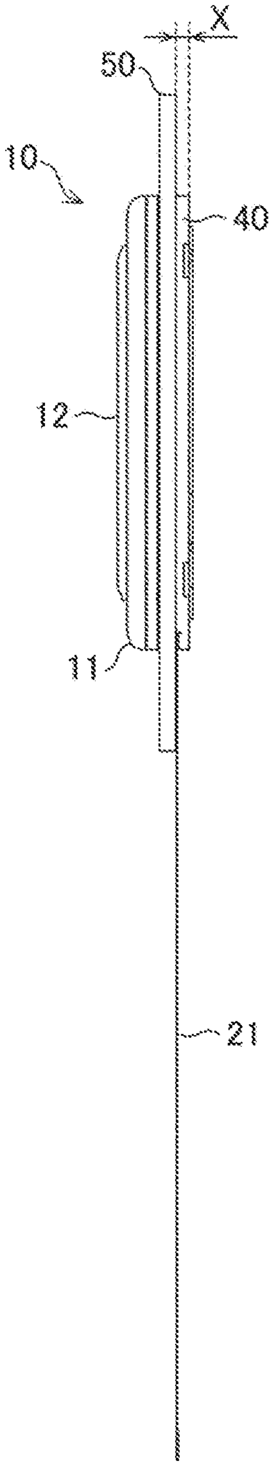
Figure 9:
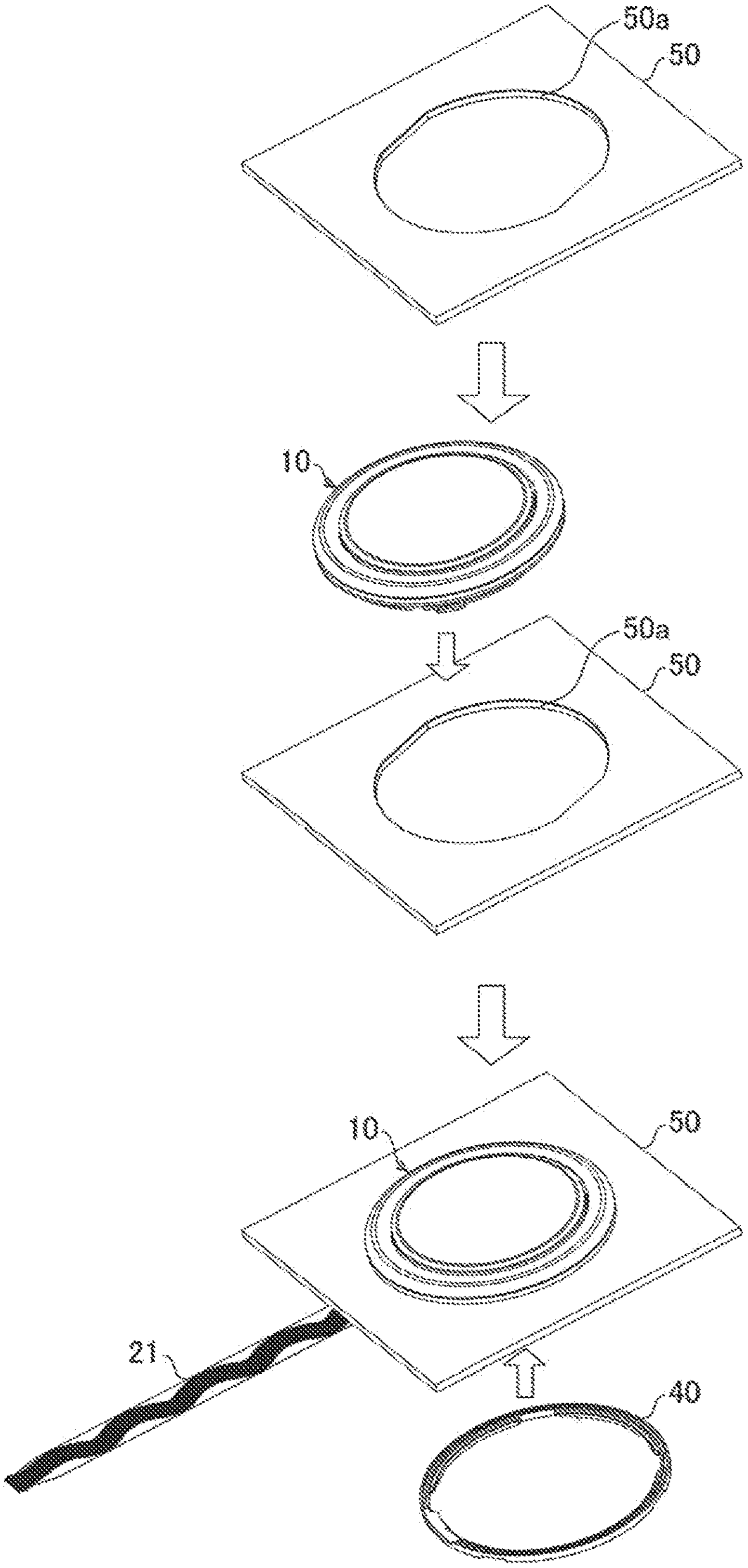
FIG. 9 is a diagram showing how the push button device is attached to the transparent plate.
Figure 10:
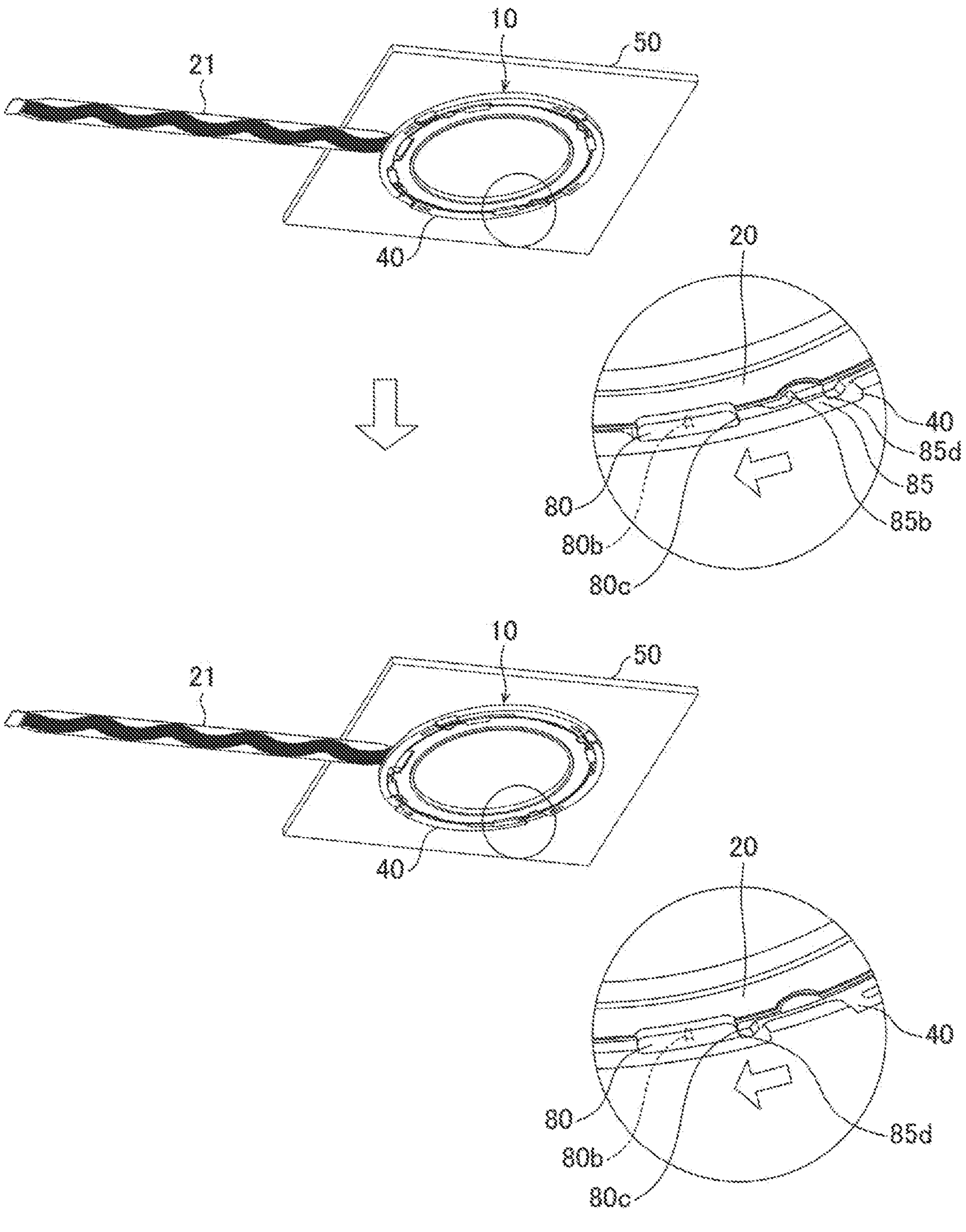
FIG. 10 is a diagram showing how the push button device is attached to the transparent plate, and includes a detail view of the main components.

As shown in FIGS. 5, 9, and 10, this push button device 10 is attached to a transparent plate 50 (serving as a support) disposed on the display screen. An opening 50*a* is formed in the transparent plate 50, and the push button device 10 is inserted into the opening 50*a* from the front side of the transparent plate 50. In the inserted state, a large diameter portion 31*a* (see FIG. 4) of the outer peripheral portion of the push button device 10 is latched to the opening 50*a*.

A lock plate 40 for fixing the push button device 10 is disposed on the back side of the transparent plate 50, and the push button device 10 is fixed to the transparent plate 50 by the lock plate 40. The lock plate 40 has an annular shape and is fitted to the outer peripheral side of the bottom part of the push button device 10 sticking out from the opening 50*a*.

A snap-fit structure for fixing the lock plate 40 to the bottom part by rotating the lock plate 40 is provided on the outer peripheral portion of the bottom part of the base 30 (which forms the outer peripheral portion of the bottom part of the push button device 10) and the inner peripheral portion of the lock plate 40.

The snap-fit structure includes a convex portion 80*b* provided on the base 30 side, and a concave portion 85*b* provided on the lock plate 40 side, and is configured such that the convex portion 80*b* enters the concave portion 85*b* while undergoing elastic deformation. A concave portion may instead be formed on the base 30 side and a convex portion on the lock plate 40 side. Resin is preferable as the material of the lock plate 40 because the configuration makes use of elastic deformation.

When the lock plate 40 is fixed to the outer peripheral portion of the bottom part of the base 30, this fixes the push button device 10 to the transparent plate 50. It is preferable to provide a plurality of snap-fit structures along the rotation direction of the lock plate 40.

When the push button device 10 is to be removed from the transparent plate 50, the lock plate 40 is rotated in the opposite direction from that at the time of attachment, to release the fixing by the snap-fit structure. Since a snap-fit structure is used, the push button device 10 can be easily attached to and detached from the transparent plate 50.

This push button device 10 is also suitable for installation on an electronic advertising display having a touch panel and located on a street or the like, or on an electronic guidance display having a touch panel and located in a commercial facility or the like.

§ 2 Configuration Example Structure of Push Button Device 10

First, the basic configuration of the push button device 10 according to one mode of the present invention will be described with reference to FIGS. 2 to 4. FIG. 2 is a plan view, a front view, and a side view of the push button device 10. As shown in FIG. 2, the push button device 10 has a circular shape in plan view, and is configured to be thin. The shape of the push button device 10 in plan view is not limited to being circular. The outer peripheral portion of the bottom part of the base 30 to which the push button device is fixed may have any shape so long as the lock plate 40 can be rotated to fix the device by snap-fitting.

The push button device 10 has the bezel 11, the base 30, and the push button unit 12 that is pressably supported between the bezel and the base. The push button device 10 is designed to have a thickness (the dimension in the pressing direction) of about 14 mm, for example. For the sake of description, in the following, assuming that the push button device 10 is disposed in a horizontal plane, the pressing direction shall be referred to as downward and the return direction as upward. Also, the side of the transparent plate 50 (a support) on which the push button device 10 is operated shall be referred to as the front side, and the side opposite the display screen as the back side.

Figure 3:
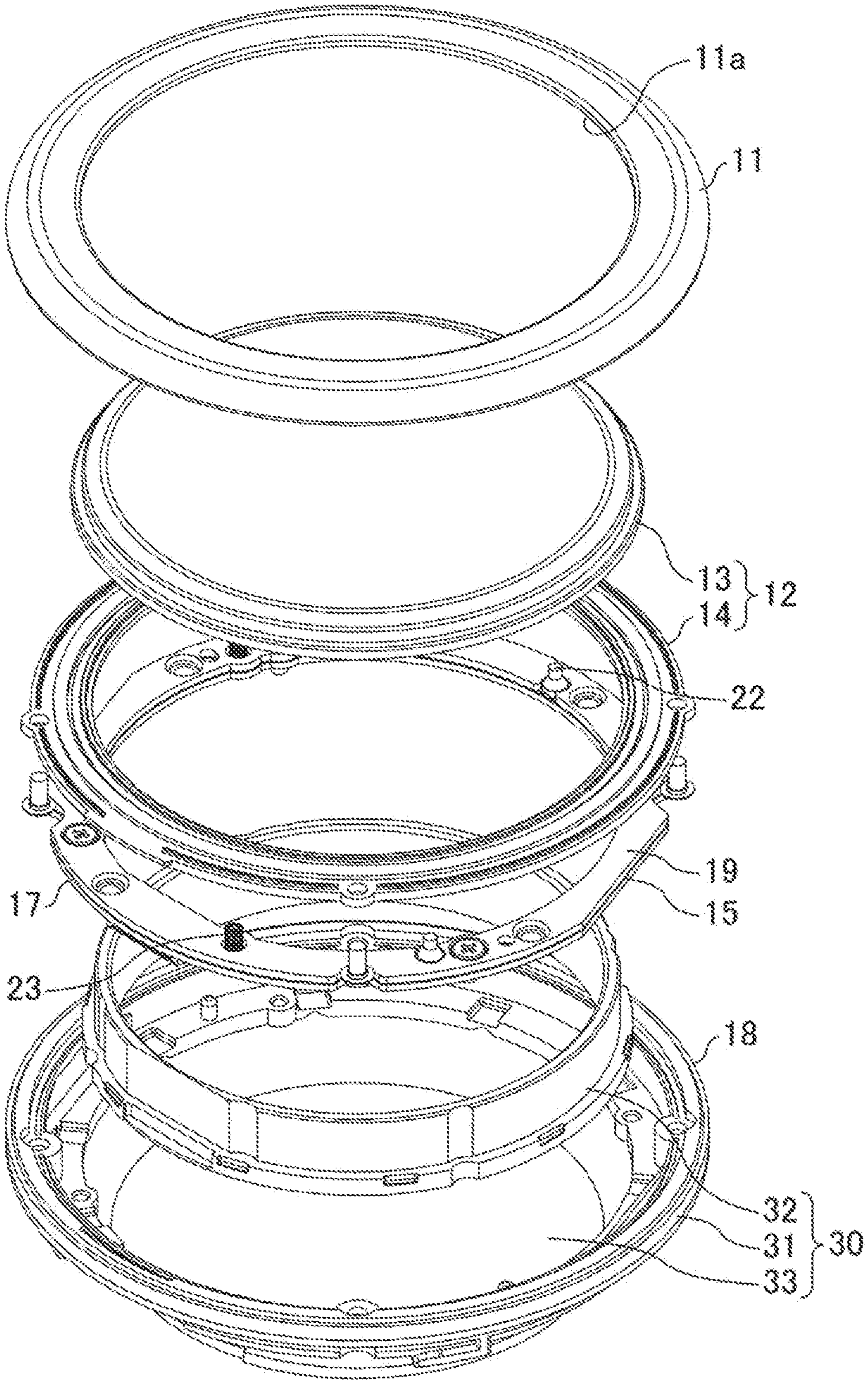
FIG. 3 is an exploded oblique view of the push button device.

FIG. 3 is an exploded oblique view of the push button device 10. FIG. 4 is a partial cross-sectional oblique view of the main components of the push button device 10 attached to the transparent plate 50. The lock plate 40, which is one of the constituent parts of the push button device 10, is not shown in FIG. 3.

As shown in FIGS. 3 and 4, in addition to the above-mentioned bezel 11, base 30, and push button unit 12, the push button device 10 further comprises a pressure-sensitive sensor board 17, an LED board 15, a waterproof sheet 18, a plate 19, and a reflective sheet 20, mechanical parts, and so on.

The bezel 11 is a cover member for covering (protecting) the outer peripheral portion of the upper surface of the push button device 10 and the side surface upper part. The bezel 11 is disposed on the outer peripheral portion of the push button unit 12, and has an opening 11*a* in which the push button unit 12 moves in the pressing direction. The bezel 11 is supported by a large diameter portion 31*a* (discussed below) of the base 30. The bezel 11 and the large diameter portion 31*a* constitute a flange portion that is latched to the opening 50*a* formed in the transparent plate 50.

The push button unit 12 is an operation unit that is pressed, and includes a thick transparent portion 13 formed of a transparent material, and an annular rubber portion 14 that is fitted to the outer peripheral portion of the transparent portion 13. On the back side of the transparent portion 13 is formed a groove 13*a* into which a guide wall 32*a* of a light blocking body 32 of the base 30 enters. The push button unit 12 moves up and down along the guide wall 32*a*. The upward movement of the push button unit 12 is restricted by the bezel 11.

A waterproof gasket is integrally provided to the rubber portion 14. In a state in which the rubber portion 14 is sandwiched between the bezel 11 and the base 30, the bezel 11 and the base 30 are fixed with screws (not shown) or the like so as to prevent liquids from infiltrating the interior of the push button device 10.

The waterproof sheet 18 is disposed on the lower surface of the large diameter portion 31*a* (discussed below) of the base 30. The waterproof sheet 18 is press-fitted to the transparent plate 50 in a state in which the push button device 10 has been attached to the transparent plate 50. This prevents liquids from coming in under the transparent plate 50 from between the push button device 10 and the transparent plate 50.

The mechanical parts include a plurality of click rubbers 22 and a plurality of springs 23. The click rubbers 22 give a click sensation when the push button unit 12 is pressed. The springs 23 return the pressed push button unit 12.

The pressure-sensitive sensor board 17 includes a pressure sensor (not shown) that detects the pressing of the push button unit 12. The pressure-sensitive sensor board 17 is sandwiched between the plate 19 and the LED board 15.

The LED board 15 includes a plurality of LEDs 16. The LEDs 16 are disposed on the lower surface of the LED board 15, with their light emitting surfaces facing down. A connector 70 is also provided on the lower surface of the LED board 15, and transparent flexible wiring 21 is connected to the connector 70.

The flexible wiring 21 electrically connects the pressure-sensitive sensor board 17 and the LED board 15, outputs the pressure detection by the pressure-sensitive sensor board 17 to the outside, and supplies a drive signal for driving the LEDs 16 to the LED board 15. An insulating sheet 25 is disposed between the pressure-sensitive sensor board 17 and the LED board 15.

The base 30 supports the push button unit 12 and the bezel 11. The base 30 also functions to attach (fix) the push button device 10 to the transparent plate 50, together with the lock plate 40.

The base 30 has a storage chamber 30*a* whose upper surface is open on the outer peripheral portion. The LED board 15, the pressure-sensitive sensor board 17, the plate 19, and the mechanical parts (springs 23 and click rubbers 22) are housed in that order in the storage chamber 30*a*.

Also, the base 30 is made up of three parts: a light guide body 31 on the outer peripheral side, a transparent body 33 in the center, and a light blocking body 32 located between the light guide body 31 and the transparent body 33.

The light guide body 31 is formed from a light conducting material, and guides the light emitted from the LEDs 16 to the side surface of the large diameter portion 31*a*. The side surface of the large diameter portion 31*a* is subjected to a light scattering treatment (such as a treatment for forming texturing) for taking out the light inside the light guide body 31 to the outside. Also, a reflection structure (not shown) such as a V-groove is provided to the light guide body 31 at the place where the light from the LEDs 16 is incident.

The light blocking body 32 is formed from an opaque material and functions to block light from leaking out of the light guide body 31 toward the inner peripheral side. On the light blocking body 32 is formed a guide wall 32*a* that guides the up and down movement of the push button unit 12 when the push button unit 12 is pressed and returns. The transparent body 33 is formed from a transparent material.

The reflective sheet 20 is disposed on the lower surfaces of the light guide body 31 and the light blocking body 32, and sends any light that has leaked out from the lower surface of the light guide body 31 back into the light guide body 31. The reflective sheet 20 is preferably a milky white sheet or the like having a diffusion function of diffusing and returning any light that leaks out from the light guide body 31, for example.

Attachment Structure of Push Button Device 10

Next, the attachment structure for attaching the push button device 10 to the transparent plate 50 will be described with reference to FIGS. 4 to 8. FIG. 5 is a plan view and a side view showing a state in which the push button device 10 has been attached to the transparent plate 50.

As shown in FIGS. 4 and 5, the push button device 10 is attached to the opening 50*a* formed in the transparent plate 50. In this attached state, the bottom part of the push button device 10 protrudes slightly to the rear side of the transparent plate 50. The amount of this protrusion can be about 2 mm, for example. The annular lock plate 40 is fitted and fixed to the outer peripheral portion of this protruding bottom part.

The lock plate 40 is fixed to the outer peripheral portion of the bottom part of the push button device 10 by a snap fit. When the lock plate 40 is rotated, the snap-fit structure (discussed below) is engaged.

The lock plate 40 has a larger diameter than the opening 50*a*, and is configured such that the surface on the lock plate 40 side hits the lock plate 40 in a state of being fixed to the outer peripheral portion of the bottom part of the push button device 10.

Consequently, the push button device 10 can be fixed to the transparent plate 50 by fixing the lock plate 40 to the bottom part of the push button device 10. The push button device 10 is securely fixed to the transparent plate 50 by sandwiching the area around the opening 50*a* of the transparent plate 50 between the lock plate 40 and the flange of the push button device 10.

Also, in order to avoid being visible through the transparent plate 50, the lock plate 40 is preferably formed in a size small enough to be hidden by the bezel 11 in plan view.

Also, the lock plate 40 preferably has a thickness such that in a state in which the lock plate 40 is fixed to the outer peripheral portion of the bottom part of the push button device 10, the position of the opposite side from the transparent plate 50 is at the same position as the bottom surface of the push button device 10. This allows the distance between the transparent plate 50 and the display screen to be reduced regardless of the thickness of the lock plate 40.

In this embodiment, snap-fit structures are provided at four locations along the rotation direction of the lock plate 40. These snap-fit structures engage at the same time and also disengage at the same time. Using a plurality of snap-fit structures affords more secure fixing between the lock plate 40 and the outer peripheral portion of the bottom part of the push button device 10.

Figure 6:
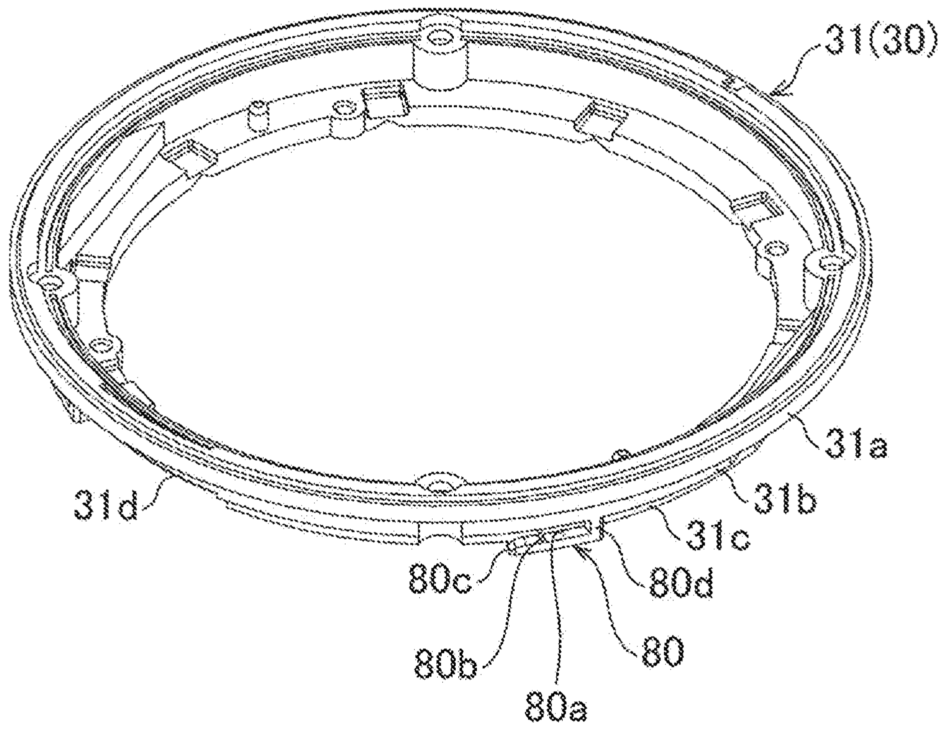
FIG. 6 is an oblique view of a light guide body of the base of the push button device as viewed from above.
Figure 7:
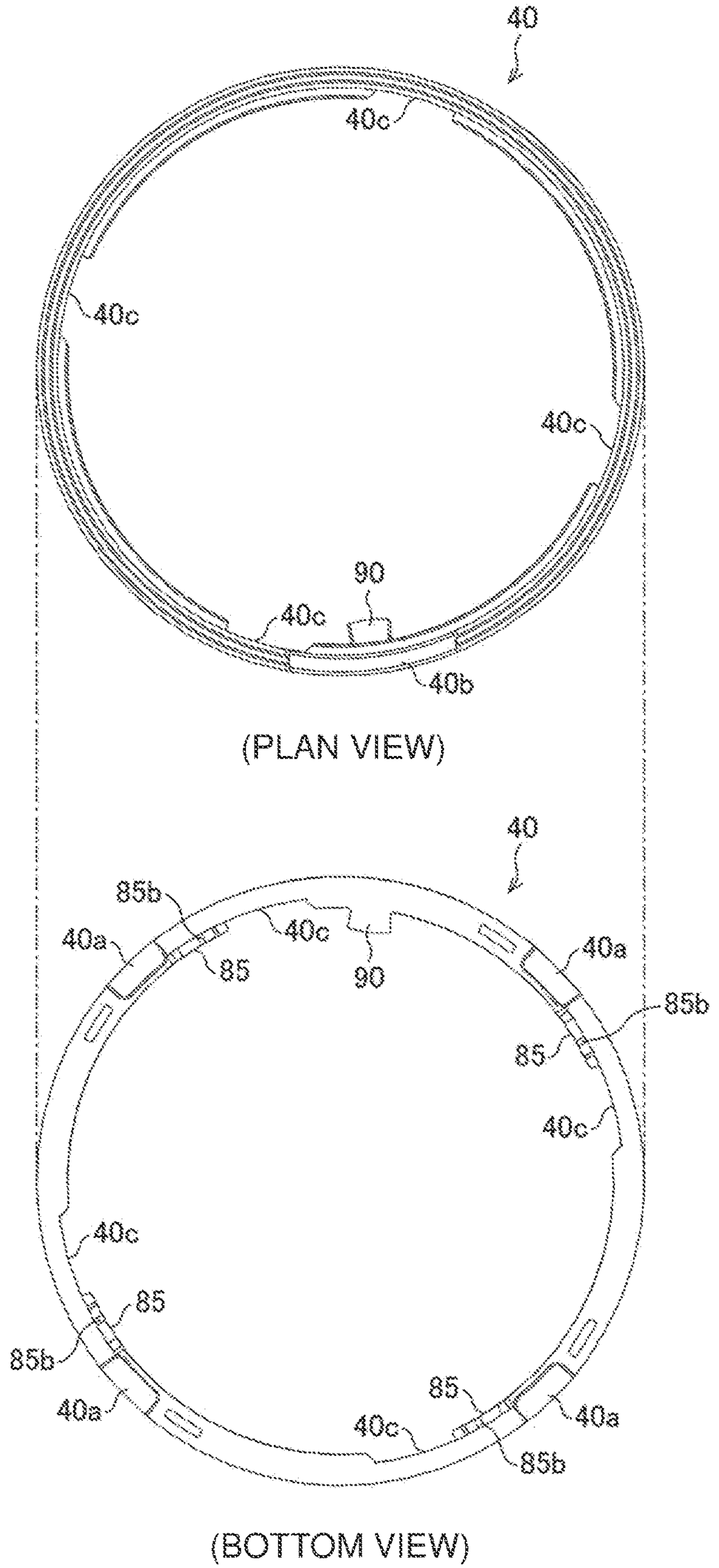
FIG. 7 is a plan view and a bottom view of a lock plate of the push button device.
Figure 8:
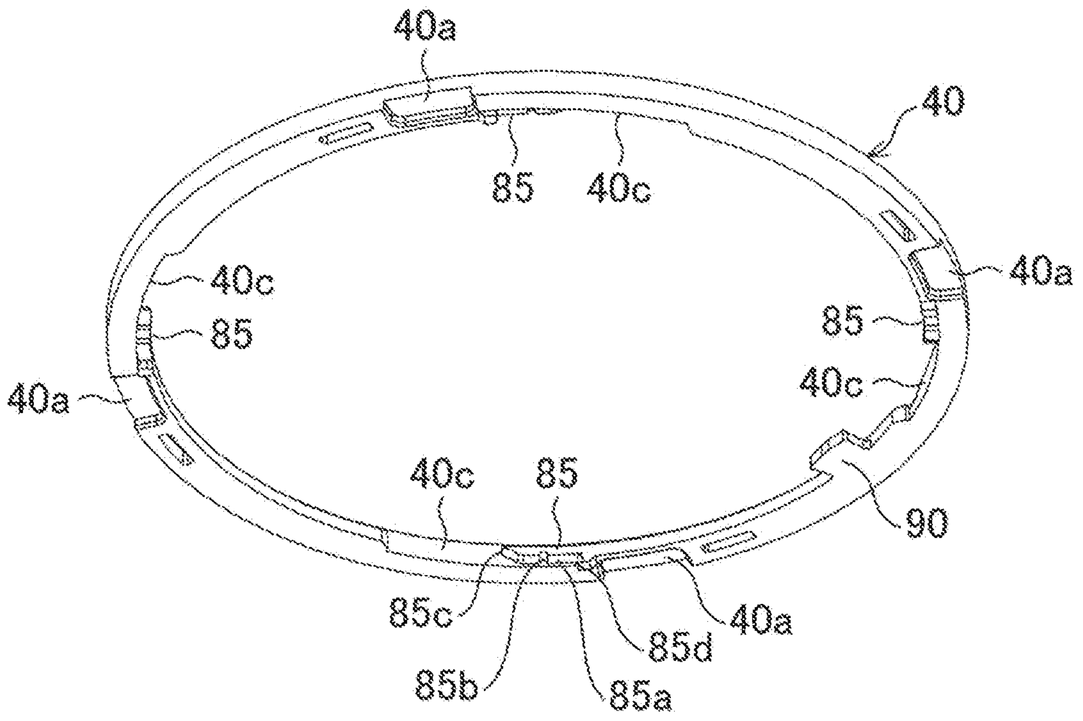
FIG. 8 is an oblique view of the lock plate as viewed from below.

In this embodiment, the snap-fit structures each have a main body-side engagement guide portion 80 (see FIG. 6) formed on the outer peripheral portion of the bottom part of the push button device 10, and a plate-side engagement guide portion 85 formed on the inner peripheral portion of the lock plate 40 (see FIGS. 7 and 8). The plate-side engagement guide portion 85 slides from the transparent plate 50 side with respect to the main body-side engagement guide portion 80. A convex portion 80*b* is formed in the main body-side engagement guide portion 80, and a concave portion 85*b* that engages with the convex portion 80*b* is formed on the sliding surface of the plate-side engagement guide portion 85.

FIG. 6 is an oblique view of the light guide body 31 of the base 30 of the push button device 10 as viewed from above. As shown in FIGS. 4 and 6, the light guide body 31 has a large diameter portion 31*a* in the upper outer peripheral portion, a medium diameter portion 31*b* in the middle outer peripheral portion, and a small diameter portion 31*c* in the bottom outer peripheral portion (lower outer peripheral portion). When the push button device 10 is inserted into the opening 50*a* of the transparent plate 50 from the front side, the large diameter portion 31*a* is latched to the transparent plate 50. Then, the medium diameter portion 31*b* is located in the opening 50*a* of the transparent plate 50, and the lower part of the medium diameter portion 31*b* and the small diameter portion 31*c* protrude slightly from the back side of the transparent plate 50.

On the outer peripheral side of the bottom surface of the light guide body 31 are formed the main body-side engagement guide portions 80, which run along the circumferential direction of the light guide body 31 and protrude outward in the radial direction to the same positions as the medium diameter portions 31*b*. The main body-side engagement guide portions 80 have a long shape in the circumferential direction and are integrally formed on the bottom surface of the light guide body 31.

The plate-side engagement guide portions 85 formed on the lock plate 40 are designed to be inserted above the main body-side engagement guide portions 80. When the lock plate 40 is rotated, the lower surfaces 85*a* of the plate-side engagement guide portions 85 formed on the lock plate 40 and the upper surfaces 80*a* of the main body-side engagement guide portions 80 slide against each other. Convex portions 80*b* that engage with the concave portions 85*b* formed on the lower surfaces 85*a* of the plate-side engagement guide portions 85 are formed on these upper surfaces 80*a*.

Figure 11:
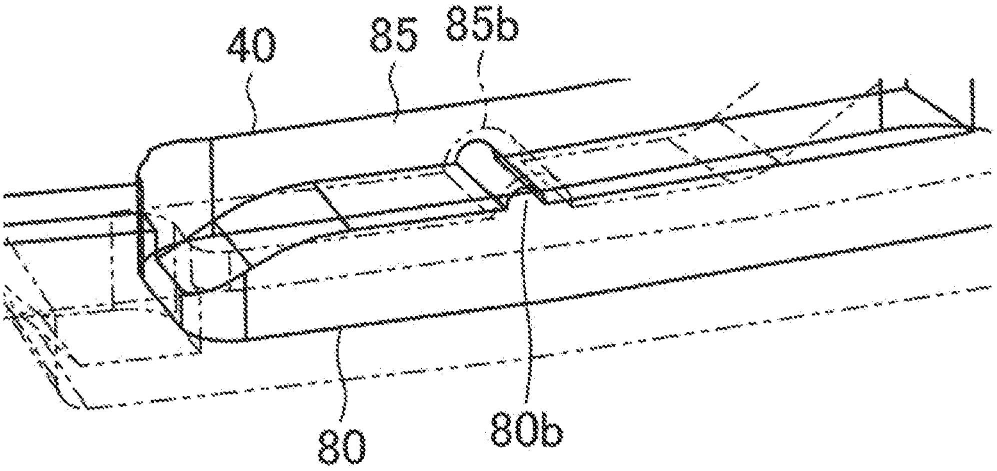
FIG. 11 is a diagram showing a state in which a convex portion of a main body-side engagement guide portion formed on the outer periphery of the bottom part of the push button device is engaged with a concave portion of a plate-side engagement guide portion formed on a lock plate.

The convex portions 80*b* have a semicircular cross section or a cylindrical lens shape, with the radial direction of the light guide body 31 being the axial direction (see FIG. 11). With a shape such as this, the lock plate 40 has a curved surface along the rotation direction, and less force is needed for engaging and disengaging the snap-fit structures.

The upper surfaces 80*a* of the main body-side engagement guide portions 80 are inclined toward the bottom surface side at the end portions 80*c* on the side where the plate-side engagement guide portions 85 are inserted, which makes it easier for the plate-side engagement guide portions 85 to go in.

The end portions 80*c* on the side where the plate-side engagement guide portions 85 are inserted and the wall portions 80*d* on the opposite side in the insertion direction abut the end portions 85*c* and the wall portions 85*d* of the plate-side engagement guide portions 85, and thereby serve to restrict further rotation of the lock plate 40.

Also, in FIG. 6, reference numeral 31*d* in the light guide body 31 is a connection opening 31*d* that is provided at a position corresponding to the connector 70 and is used for connecting the flexible wiring 21.

FIG. 7 is a plan view and a bottom view of the lock plate 40 of the push button device 10. FIG. 8 is an oblique view of the lock plate 40 as viewed from below. As shown in FIGS. 7 and 8, the lock plate 40 has the plate-side engagement guide portions 85 on its inner peripheral portion. The plate-side engagement guide portions 85 are each formed as a recess that is recessed from the lower surface of the lock plate 40, and have a long shape in the circumferential direction.

Also, on the inner peripheral portion of the lock plate 40, relief portions 40*c* that avoid interference with the main body-side engagement guide portions 80 in a state in which the lock plate 40 is fitted to the outer periphery of the bottom part of the push button device 10, are formed on the front side in the insertion direction of the plate-side engagement guide portions 85. The lock plate 40 is fitted to the outer peripheral portion of the bottom part of the push button device 10 so that the relief portions 40*c* are aligned with the main body-side engagement guide portions 80.

When the lock plate 40 is rotated, the lower surfaces 85*a* of the plate-side engagement guide portions 85 slide against the upper surfaces 80*a* of the main body-side engagement guide portions 80 formed on the light guide body 31 of the base 30. The concave portions 85*b*, which engage with the convex portions 80*b* formed on the upper surfaces 80*a* of the main body-side engagement guide portions 80, are formed on these lower surfaces 85*a*. The shape of the concave portions 85*b* is also a semicircular cross-sectional shape or a cylindrical lens shape to match the shape of the convex portions 80*b* (see FIG. 11).

The lower surfaces 85*a* of the plate-side engagement guide portions 85 are also inclined toward the upper surface side at the end portions 85*c* that are in front when inserted into the main body-side engagement guide portions 80, which makes it easier to go into the main body-side engagement guide portions 80. Also, the end portions 85*c* on the side to be inserted into the main body-side engagement guide portions 80 and the wall portions 85*d* on the opposite side in the insertion direction are designed to abut the wall portions 80*d* and the end portions 80*c* of the main body-side engagement guide portions 80.

Figure 13:
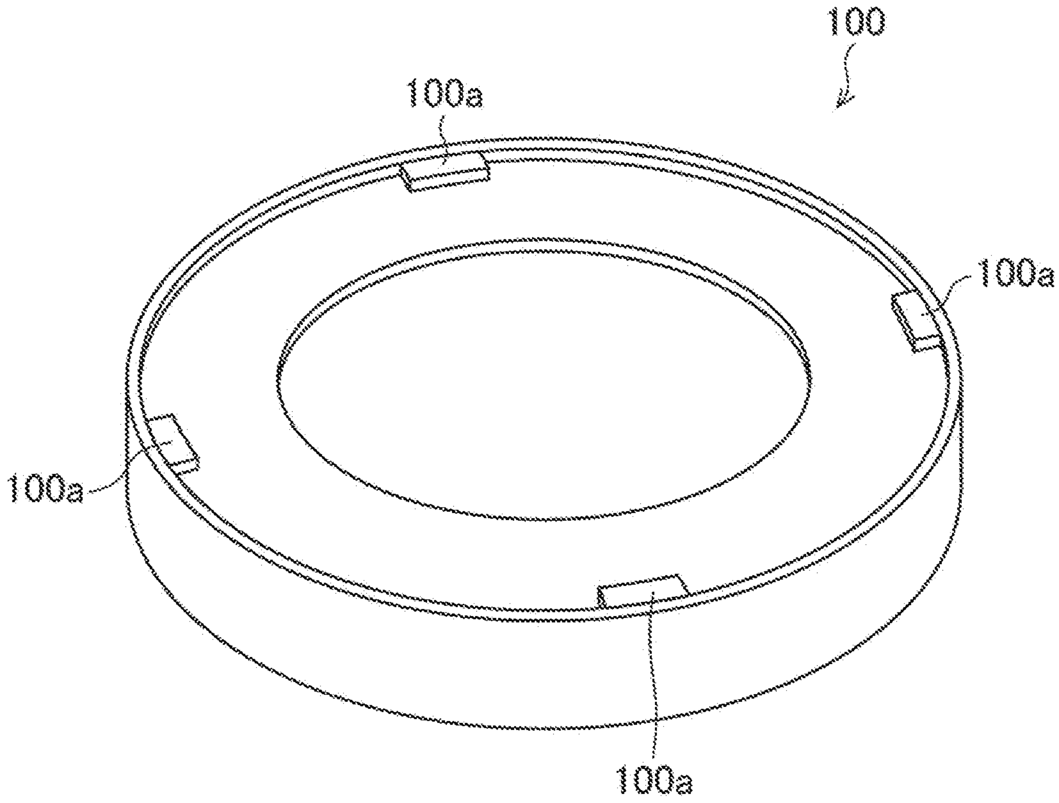
FIG. 13 is an oblique view of a special jig used when attaching or detaching the lock plate to or from the outer peripheral portion of the bottom part of the push button device.

Also, jig recesses 40*a* that engage with a dedicated jig 100 (see FIG. 13) used when attaching or detaching the lock plate 40 are formed on the lower surface of the lock plate 40. As shown in FIG. 13, the dedicated jig 100 has protrusions 100*a* that engage with the jig recesses 40*a*, and these protrusions 100*a* are fitted into the jig recesses 40*a* to allow the lock plate 40 to be attached and detached much like how a bottle cap opens and closes. A plurality of jig recesses 40*a* and protrusions 100*a* are formed in order to impart force more evenly to the lock plate 40.

Furthermore, the lock plate 40 is provided with a locking piece 90 that covers a flapper (cover portion) 71 of a connector 70 to which the flexible wiring 21 is connected at a fixed position. The locking piece 90 restricts the flapper (cover portion) 71 of the connector 70 from opening. This will be described in Embodiment 2.

Attachment Procedure for Push Button Device 10

Figure 12:
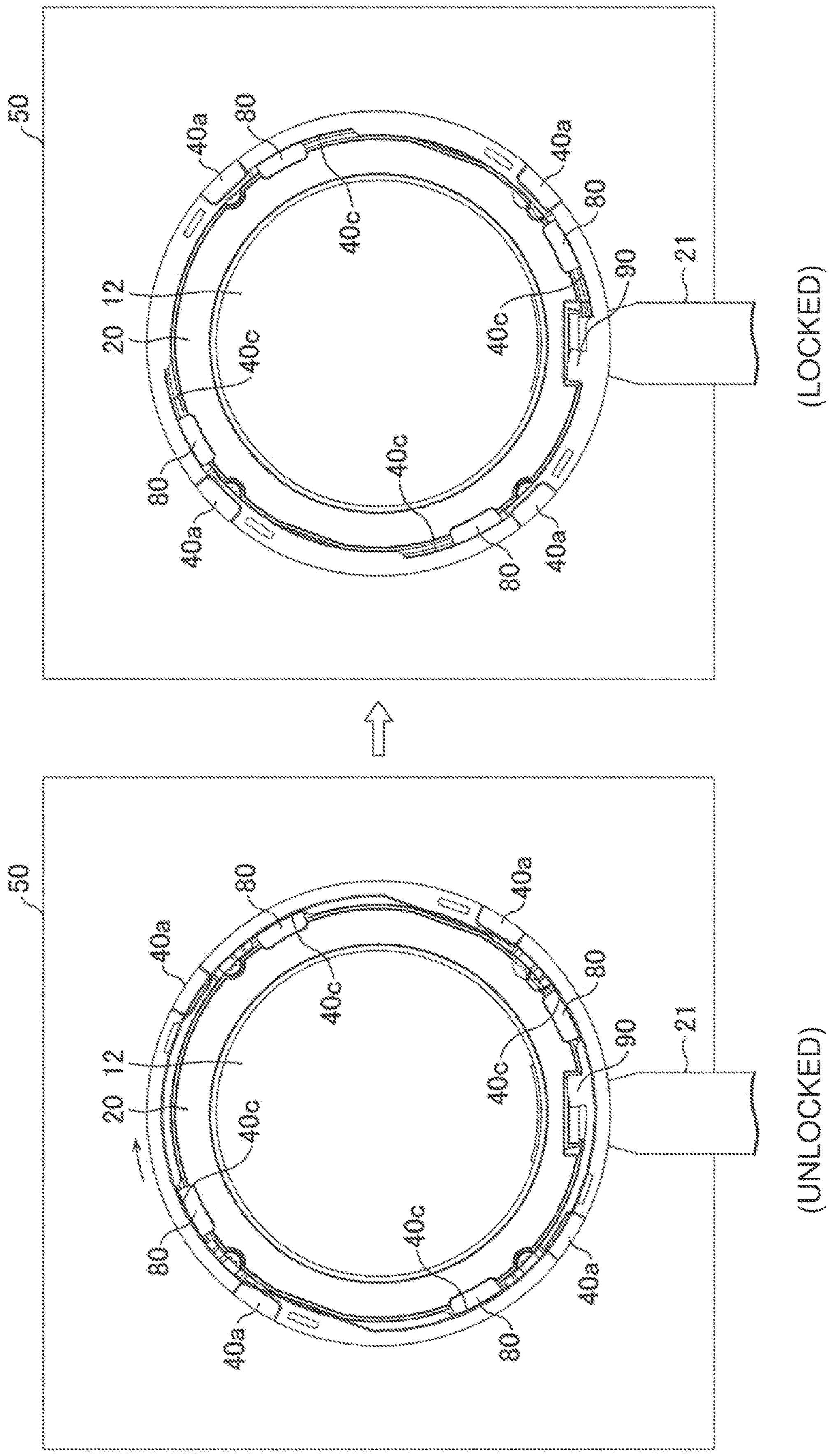
FIG. 12 is a view seen from the back side of the transparent plate, showing an unlocked state before the lock plate is rotated, and a locked state in which the lock plate has been rotated.

FIGS. 9 and 10 are diagrams showing how to attach the push button device 10 to the transparent plate 50. FIG. 9 is a view from the front side of the transparent plate 50, and FIG. 10 is a view from the back side of the transparent plate 50. FIG. 10 also shows a detail view of the main components. FIG. 11 is a diagram showing a state in which a convex portion 80*b* of a main body-side engagement guide portion 80 and a concave portion 85*b* of a plate-side engagement guide portion 85 are engaged with each other. FIG. 12 is a view from the back side of the transparent plate 50, and shows the unlocked state before the lock plate 40 is rotated, and the locked state in which the lock plate 40 has been rotated.

As shown in FIG. 9, the opening 50*a* formed in the transparent plate 50 is substantially circular, with opposing parallel sides, and the bottom part of the push button device 10 has a similar shape. This restricts the rotation of the push button device 10 with respect to the transparent plate 50, allowing the position to be fixed.

The push button device 10 is inserted from the front side into the opening 50*a* formed in the transparent plate 50. Next, the flexible wiring 21 is attached from the back side of the transparent plate 50 to the connector 70 on the outer peripheral portion of the bottom part of the push button device 10 protruding from the opening 50*a* to the back side. Next, the lock plate 40 is fitted from the back side of the transparent plate 50 to the outer peripheral portion of the bottom part of the push button device 10 protruding from the back side of the opening 50*a*.

As shown in the unlocked state in FIG. 12, the lock plate 40 is fitted so that the locking piece 90 is located on the connector 70 and the main body-side engagement guide portions 80 are inserted into the relief portions 40*c*. Then, the lock plate 40 is rotated by using the special jig 100 (FIG. 13). Consequently, the convex portions 80*b* and the concave portions 85*b* formed at a plurality of locations are simultaneously engaged with each other as shown in FIG. 11, resulting in a locked state. As shown in FIG. 12, the locking piece 90 is located on the connector 70 in the locked state.

Since the engagement between the convex portions 80*b* and the concave portions 85*b* is produced by snap-fit structures, fixing and unfixing can be performed simply by rotating the lock plate 40. Consequently, the push button device 10 can be easily attached to and detached from the transparent plate 50 without having to provide a latching mechanism on the transparent plate 50 side.

Also, since the lock plate 40 is fixed to the outer peripheral portion of the bottom part of the push button device 10, the thickness of the push button device 10 is not increased by the components used for attachment. With an attachment structure such as this, the distance between the transparent plate 50 and the display screen can be reduced to about 3 mm.

Furthermore, with the above-mentioned snap-fit structures, in a state in which the lock plate 40 is fixed to the outer peripheral portion of the bottom part of the push button device 10, the engaged concave portions 85*b* and convex portions 80*b* continue to receive force in the direction in which they are being pressed together.

Consequently, engagement can be maintained even though the concave portions 85*b* and convex portions 80*b* are very small in size, such as 1 mm or less.

Embodiment 2

Another embodiment of the present invention will now be described. For the sake of description, those members having the same functions as the members described in the embodiment described above will be numbered the same and will not be described again.

Figure 14:
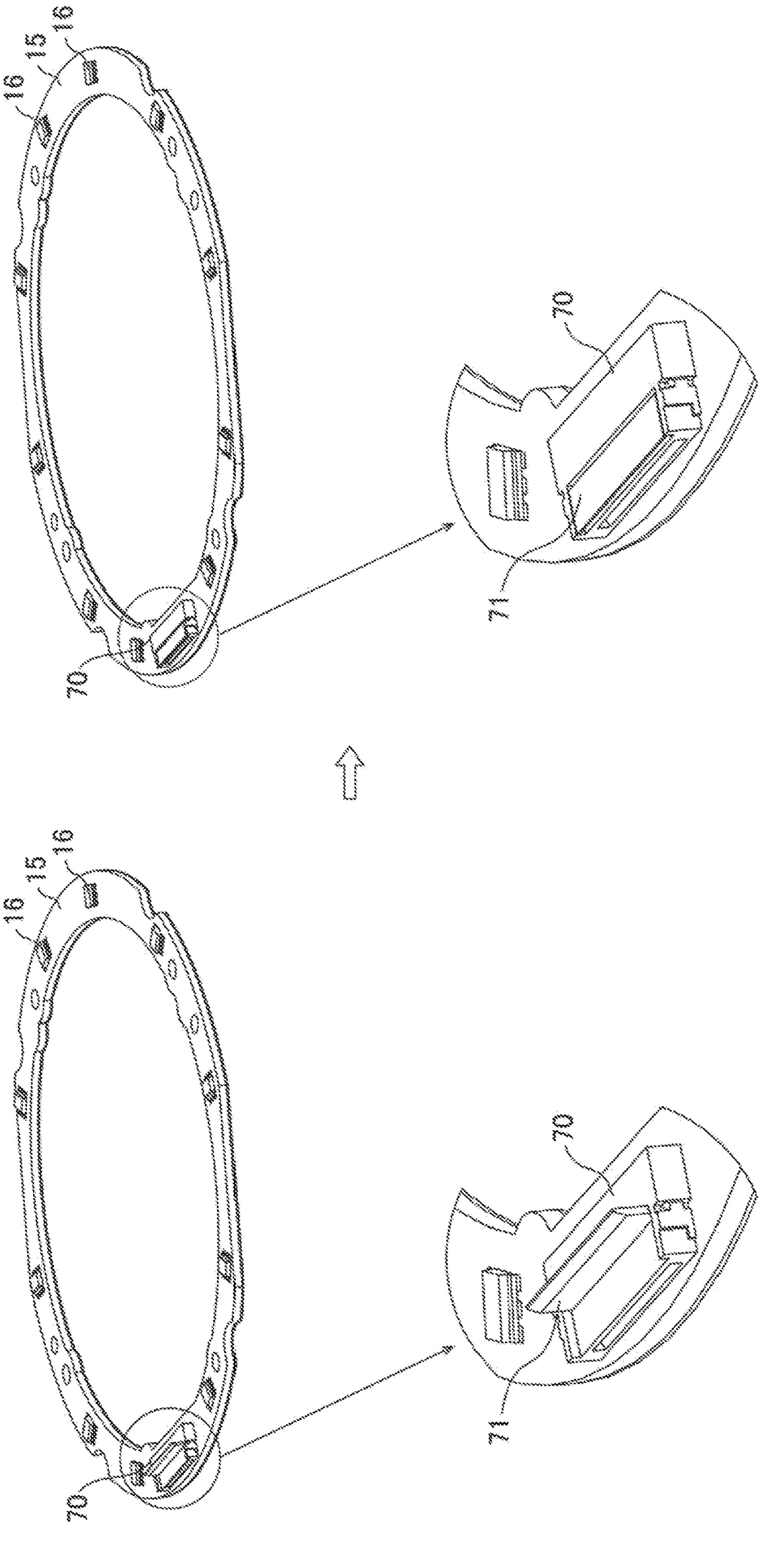
FIG. 14 is an oblique view and a detail view of the main components, with the lower surface of the LED board of the push button device facing upward, and shows the open state and the closed state of a flapper.
Figure 15:
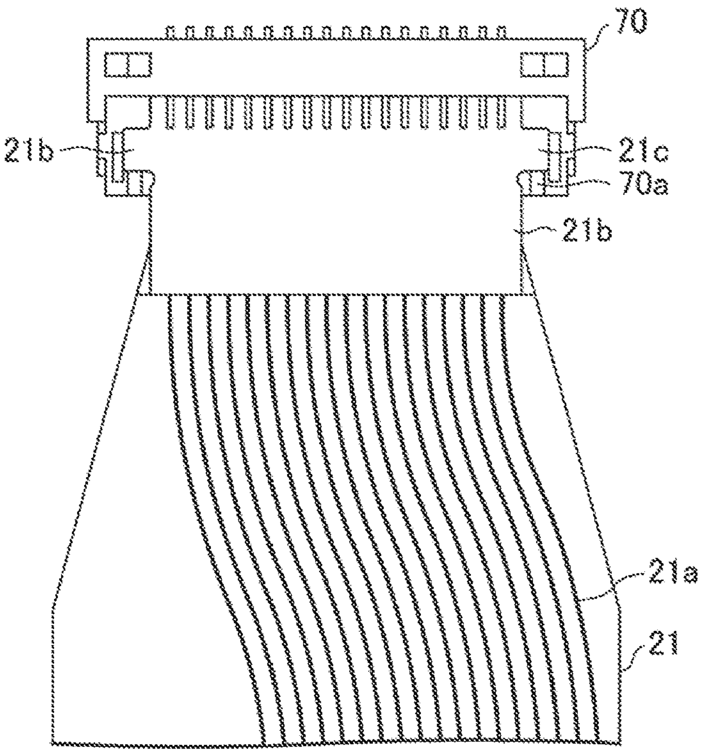
FIG. 15 is a diagram showing the portion of the flexible wiring that is connected to a connector.

FIG. 14 is an oblique view and a detail view of the main components, with the lower surface of the LED board 15 of the push button device 10 facing upward, and shows the open state and closed state of the flapper 71. As shown in FIG. 14, the connector 70 is provided with a flapper (rotary lid portion) 71 in order to prevent the flexible wiring 21 from coming loose. The flapper 71 protrudes from the bottom surface of the push button device 10 in the open state. FIG. 15 is a diagram showing a portion of the flexible wiring 21 that is connected to the connector 70. The flapper 71 is not shown in FIG. 15.

As shown in FIG. 15, the flexible wiring 21 has reinforcing portions 21*b* at the distal end terminal portions. Latching portions 21*c* are formed on both sides of the reinforcing portions 21*b* so as to abut and be latched to a receiving portion 70*a* on the connector 70 side. The flexible wiring 21 can be locked by closing the flapper 71 in a state in which the latching portions 21*c* have been received by the receiving portion 70*a* on the connector 70 side.

The flexible wiring 21 is attached at the same time as when the push button device 10 is attached to the transparent plate 50, but it is conceivable that the user may finish this attachment while forgetting to close the flapper 71. When the flapper 71 is open, the flexible wiring 21 can easily come loose due to vibration or the like.

In view of this, in this embodiment, as shown in FIG. 12, the lock plate 40 is provided with the locking piece 90 that covers the flapper 71 of the connector 70 in the fixed position. The locking piece 90 functions to restrict the flapper 71 from opening.

With this configuration, if the user has forgotten to close the flapper 71, even if the user tries to rotate the lock plate 40, the locking piece 90 will hit the flapper 71 and prevent rotation. Therefore, this reliably prevents the user from forgetting to close the flapper 71. This measure for preventing the flexible wiring 21 from coming loose can be performed unconsciously along with the work of attaching the push button device 10 to the transparent plate 50, and the locking of the flexible wiring 21 can be accomplished simultaneously with the fixing of the push button device 10 to the transparent plate 50.

Figure 16:
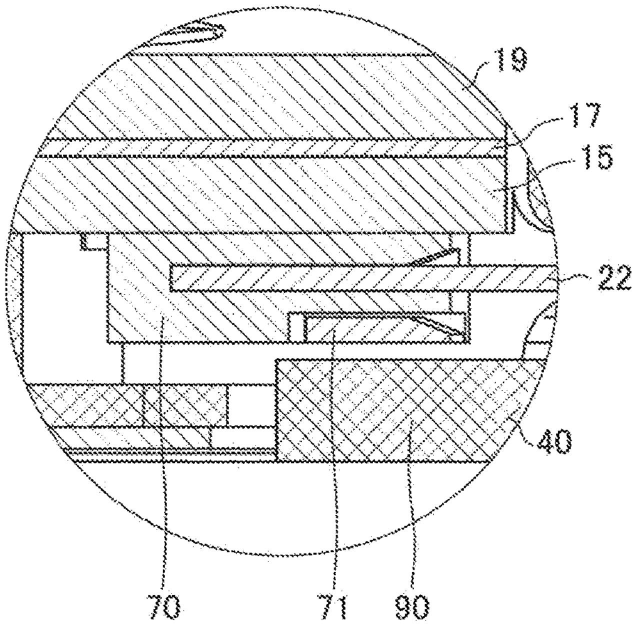
FIG. 16 is a cross-sectional view of the main components of the push button device to which the flexible wiring is connected.

FIG. 16 is a cross-sectional view of the main components in the portion of the push button device 10 to which the flexible wiring 21 is connected. As shown in FIG. 16, the locking piece 90 covers the flapper 71 from the bottom surface side of the push button device 10 in a state in which the lock plate 40 is fixed to the outer peripheral portion of the bottom part of the push button device 10. Consequently, the flapper 71 is physically prevented from opening, and the flexible wiring 21 can be reliably prevented from coming loose.

Also, with a conventional measure for preventing flexible wiring from coming loose using double-sided tape or an adhesive agent, the wiring could not be replaced in the event of a disconnection in the flexible wiring, but with the above configuration, not only is the wiring resistant to vibration, but parts can also be replaced.

SUMMARY

The push button according to one mode of the present invention comprises a push button device main body that has a flange portion which latches to an opening formed in the support plate, and that is inserted into the opening from the front side; and an annular lock plate that is disposed on the back side of the support plate, is fitted to the outer peripheral portion of the bottom part of the push button device main body on the back side of the support plate, and is fixed to the outer peripheral portion of the bottom part by being rotated, wherein a snap-fit structure, which is fixed to the outer peripheral portion of the bottom part by rotating the lock plate, is provided to the inner peripheral portion of the lock plate and the outer peripheral portion of the bottom part, and the lock plate is configured to have a larger diameter than the opening, and such that the surface on the support plate side hits the support plate in a state of being fixed to the outer peripheral portion of the bottom part.

With the above configuration, the push button device main body is inserted from the front side into the opening formed in the support plate, and the lock plate is fitted from the back side of the support plate to the outer peripheral portion of the bottom part of the push button device main body. The snap-fit structure is provided to the outer peripheral portion of the bottom part of the push button device main body and the inner peripheral portion of the lock plate to fix the lock plate to the outer peripheral portion of the bottom by rotating the lock plate. Therefore, the lock plate can be fixed to the outer peripheral portion of the bottom part of the push button device main body by rotating the lock plate.

The lock plate is configured to have a diameter larger than that of the opening, and such that the surface on the support plate side hits the support plate in a state of being fixed to the outer peripheral portion of the bottom part of the push button device main body. Therefore, by fixing the lock plate to the outer peripheral portion of the bottom part of the push button device main body, the push button device main body can be securely fixed to the support plate by sandwiching the support plate (the portion around the opening) between the lock plate and the flange of the push button device main body.

Since a snap-fit structure is used, the lock plate can be easily fixed and unfixed, which in turn makes it easy to attach and detach the push button device body from the support plate.

Also, since the lock plate is fixed to the outer peripheral portion of the bottom part of the push button device main body, the support plate can be disposed closer to the display screen by reducing the thickness of the lock plate.

In the push button device according to one mode of the present invention, the lock plate is further configured such that in a state of being fixed to the outer peripheral portion of the bottom part, the position of the surface on the opposite side from the support plate is roughly the same position as the bottom surface of the push button device main body. With the above configuration, the support plate can be positioned as close as possible to the display screen, regardless of the thickness of the lock plate.

In the push button device according to one mode of the present invention, the lock plate is formed small enough to be hidden by the flange portion in plan view. With the above configuration, since the lock plate is formed small enough to be hidden by the flange portion, it is difficult to see the lock plate even though the support plate is transparent.

In the push button device according to one mode of the present invention, the configuration may be such that a plurality of the snap-fit structures are provided along the rotation direction of the lock plate, and the snap-fit structures are simultaneously engaged when the lock plate is rotated. With the above configuration, because a plurality of snap-fit structures are used, the fixing between the lock plate and the bottom part of the push button device main body can be further strengthened.

In the push button device according to one mode of the present invention, the configuration may be such that the snap-fit structure has a main body-side engagement guide portion that is formed on the outer peripheral portion of the bottom part, and a plate-side engagement guide portion that is formed on the outer peripheral portion of the bottom part and slides from the support plate side with respect to the main body-side engagement guide portion, and either concave portions or convex portions that engage with each other are formed on each sliding surface of the main body-side engagement guide portion and the plate-side engagement guide portion.

With the above configuration, in a state in which the lock plate is fixed to the outer peripheral portion of the bottom part, the engaged concave portion and the convex portion continue to receive force in the direction in which they are being pressed together, so that the concave portion and the convex portion are securely fixed together even though the concave portions and convex portions are very small in size, such as 1 mm or less.

In the push button device according to one mode of the present invention, the configuration may be such that the push button device main body has a connection opening for connecting flexible wiring to an internal connector on the outer peripheral portion of the bottom part, the connector comprises a rotary lid portion for preventing the flexible wiring from coming loose, the lid portion protrudes from the bottom surface of the push button device main body in an open state, and the lock plate is provided with a locking piece that covers the lid portion from the bottom surface side of the push button device main body in a state of being fixed to the outer peripheral portion of the bottom part.

The flexible wiring attached to the connector is prevented from coming loose by an opening and closing lid. The flexible wiring is attached at the same time as when the push button device is attached to the support plate, but it is conceivable that the user may finish this attachment while forgetting to close the lid portion. When the lid portion is open, the flexible wiring 21 can easily come loose due to vibration or the like.

With the above configuration, since the locking piece is provided to the lock plate, if the user forgets to close the lid portion, the locking piece will hit the lid portion when the lock plate is rotated, and the attachment of the push button device will not be completed. Therefore, the user is reliably prevented from forgetting to close the lid portion.

Moreover, since the locking piece covers the lid portion from the bottom side while the lock plate is fixed to the outer peripheral portion of the bottom part, the lid portion is physically prevented from being opening by vibration, so the flexible wiring can be reliably prevented from coming loose. This measure for preventing the flexible wiring from coming loose can be performed unconsciously along with the work of attaching the push button device to the support plate.

Also, with a conventional measure for preventing flexible wiring from coming loose using double-sided tape or an adhesive agent, the wiring could not be replaced in the event of a disconnection in the flexible wiring, but with the above configuration, not only is the wiring resistant to vibration, but parts can also be replaced.

The present invention is not limited to or by the embodiments given above, and various modifications are possible within the scope of the claims. Embodiments obtained by suitably combining the technical means disclosed in different embodiments are also encompassed by the technical scope of the present invention.

REFERENCE SIGNS LIST

1 slot machine (game machine)
10 push button device
11 bezel
11*a* opening
12 push button unit
15 LED board
16 LED
17 pressure-sensitive sensor board
18 waterproof sheet
19 plate
20 reflective sheet
21 flexible wiring
22 click rubber
21 latching portion
21*b* reinforcing portion
23 spring
25 insulating sheet
30 base
31 light guide body
31*a* large diameter part
31*b* medium diameter part
31*c* small diameter part
31*d* connection opening
32*a* guide wall
33 transparent body
40 lock plate
40*a* jig recess
50*a* opening
50 transparent plate
70 connector
70*a* receiving portion
71 flapper (lid portion)
80 main body-side engagement guide portion
80*a* upper surface
80*b* convex portion
80*c*, 85*c* end portion
80*d*, 85*d* wall portion
85 plate-side engagement guide portion
85*a* bottom surface
85*b* concave portion
90 locking piece
100 jig
100*a* protrusion

The invention claimed is:

1. A push button device, comprising:

a push button device main body having a flange portion configured to latch to an opening formed in a support plate, and being inserted into the opening from a front side;

an annular lock plate that is disposed on a back side of the support plate, is fitted to an outer peripheral portion of a bottom part of the push button device main body on the back side of the support plate, and is fixed to the outer peripheral portion of the bottom part by being rotated; and an internal connector on the outer peripheral portion of the bottom part, wherein a snap-fit structure, which is fixed to the outer peripheral portion of the bottom part by rotating the lock plate, is provided to an inner peripheral portion of the lock plate and the outer peripheral portion of the bottom part, the lock plate is configured to have a larger diameter than the opening, and such that a surface on a support plate side hits the support plate in a state of being fixed to the outer peripheral portion of the bottom part, the internal connector comprises a rotary lid portion configured to prevent flexible wiring from coming loose, and the lid portion protrudes from a bottom part of the push button device main body in an open state, and the lock plate is provided with a locking piece configured to cover the lid portion from a side of the bottom part of the push button device main body in a state of being fixed to the outer peripheral portion of the bottom part.

2. The push button device according to claim 1, wherein the lock plate is configured such that in a state of being fixed to the outer peripheral portion of the bottom part, a position of the surface on an opposite side from the support plate is roughly a same position as a bottom surface of the push button device main body.

3. The push button device according to claim 1, wherein the lock plate is formed small enough to be hidden by the flange portion in plan view.

4. The push button device according to claim 1, wherein a plurality of the snap-fit structures are provided along a rotation direction of the lock plate, and the plurality of snap-fit structures are simultaneously engaged by a rotation of the lock plate.

5. The push button device according to claim 1, wherein the snap-fit structure has a main body-side engagement guide portion that is formed on the outer peripheral portion of the bottom part, and a plate-side engagement guide portion that is formed on the inner peripheral portion of the lock plate and slides from a side of the support plate with respect to the main body-side engagement guide portion, and either concave portions or convex portions configured to engage with each other are formed on each sliding surface of the main body-side engagement guide portion and the plate-side engagement guide portion.

6. The push button device according to claim 1, wherein the push button device main body has a connection opening configured to connect the flexible wiring to the internal connector on the outer peripheral portion of the bottom part.

* * * * *